(12) United States Patent
Mass et al.

(10) Patent No.: US 10,122,063 B2
(45) Date of Patent: Nov. 6, 2018

(54) METHOD OF MAKING A LOW MASS FOAM ELECTRICAL STRUCTURE

(71) Applicant: Northrop Grumman Systems Corporation, Falls Church, VA (US)

(72) Inventors: Steven J. Mass, La Palma, CA (US); Anthony L. Long, Redondo Beach, CA (US); Mansoor K. Siddiqui, Torrance, CA (US); Marijan D. Grgas, Rancho Palos Verdes, CA (US); Gershon Akerling, Culver City, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 285 days.

(21) Appl. No.: 15/013,551

(22) Filed: Feb. 2, 2016

(65) Prior Publication Data

US 2016/0149286 A1 May 26, 2016

Related U.S. Application Data

(62) Division of application No. 13/315,590, filed on Dec. 9, 2011, now Pat. No. 9,293,800.

(51) Int. Cl.
*H01P 11/00* (2006.01)
*H01P 3/08* (2006.01)
(Continued)

(52) U.S. Cl.
CPC .............. *H01P 11/006* (2013.01); *H01P 3/06* (2013.01); *H01P 3/08* (2013.01); *H01P 3/087* (2013.01);
(Continued)

(58) Field of Classification Search
CPC .... H01P 11/001; H01P 11/002; H01P 11/006; H01P 3/06; H01P 3/08; H01P 3/087;
(Continued)

(56) References Cited

U.S. PATENT DOCUMENTS

| 4,020,875 A * | 5/1977 | Akiba | H01P 11/002 |
| | | | 138/128 |
| 7,179,844 B2 * | 2/2007 | Aki | H01B 3/30 |
| | | | 342/11 |
| 2007/0138676 A1 * | 6/2007 | Hamaguchi | C04B 35/6269 |
| | | | 264/29.1 |

FOREIGN PATENT DOCUMENTS

| JP | 2003023308 A | * | 1/2003 |
| JP | 2003298320 A | * | 10/2003 |

OTHER PUBLICATIONS

Machine Tranlsation (English) of Japanese Patent Publication, JP 2003-298320, Jun. 2018.*

* cited by examiner

*Primary Examiner* — A. Dexter Tugbang
(74) *Attorney, Agent, or Firm* — Patti & Malvone Law Group, LLC

(57) ABSTRACT

A method of making an electrical structure having a foam housing is set forth. The foam housing includes an interior surface forming a conductive cavity adapted to carry energized waveforms therethrough. An electrical component of the electrical structure is integrally formed with the interior surface as the foam housing of the structure is assembled. The method includes the steps of depositing a plating material into a mold, pouring a foam polymer into the mold and removing the plated foam structure from the mold without etching the section from the mold. The method further includes steps of forming a metallic form into a planar structure, filling the open pores of the foam with a material such as photo-resist, machining a cavity from the foam, electroplating the cavity in the foam then removing the photo-resist material.

3 Claims, 17 Drawing Sheets

(51) Int. Cl.
*H01P 3/06* (2006.01)
*H01P 3/12* (2006.01)
*H01B 3/30* (2006.01)
*C04B 35/626* (2006.01)

(52) U.S. Cl.
CPC ............... *H01P 3/12* (2013.01); *H01P 3/121* (2013.01); *H01P 11/001* (2013.01); *H01P 11/002* (2013.01); *C04B 35/6269* (2013.01); *H01B 3/30* (2013.01); *Y10T 29/49016* (2015.01); *Y10T 29/49018* (2015.01)

(58) Field of Classification Search
CPC ... H01P 3/12; H01P 3/121; H01B 3/30; C04B 35/6269; Y10T 29/49016; Y10T 29/49018
See application file for complete search history.

METHOD OF MAKING A LOW MASS FOAM ELECTRICAL STRUCTURE

STATEMENT OF RELATED CASES

This application is a divisional application of U.S. Ser. No. 13/315,590 filed Dec. 9, 2011 entitled "LOW MASS FOAM ELECTRICAL STRUCTURE", now U.S. Pat. No. 9,293,800, and claims priority to provisional application U.S. Ser. No. 61/459,323 entitled "LOW MASS RF STRUCTURES (LMRS)", filed Dec. 10, 2010, the entireties of which are incorporated herein by reference.

TECHNICAL FIELD

This invention relates to foam electrical structures for transmitting signals.

BACKGROUND OF THE INVENTION

Modular structures have been developed for transmitting signals for a wide variety of electrical systems. Such structures are typically provided in a system to achieve a required system function, such as, for example, to direct, redirect, attenuate, combine or spread signals to one or more desired locations.

Modular structure fabrication for electrical systems can be complicated by inherent drawbacks, such as cost, temperature tolerances, size, compatibility, connectability, and structural complexity. The resulting structures frequently require multiple components to achieve a modular structure. Also, prefabrication requirements can substantially inhibit transportation and portability of the resulting structures. Cumbersome structures for directing signals are not suitable for a number of applications, such as portable applications or space applications. Additionally, temperature considerations can affect the usefulness of the structures.

SUMMARY OF THE INVENTION

In accordance with the principles herein, an electrical structure having a foam housing is set forth. The foam housing includes an interior surface forming a conductive cavity adapted to carry energized waveforms therethrough. An electrical component of the electrical structure is integrally formed with the interior surface as the foam housing of the structure is assembled.

The foam housing can include a suitable organic or metallic foam such as, for example, ECCOSTOCK® FPH, aluminum foam or any other suitable lightweight material. The foam housing of the electrical structure can include a first housing section and a second housing section. The electrical component can be integrally formed during a fusing of the first housing section to the second housing section.

Any suitable electrical structure, such as, for example, a waveguide can be formed in accordance with the principles herein. An electrical structure formed in accordance with the present principles can include, for example, a suspended conductor, a strip-line conductor, a coaxial conductor, a combiner, a splitter or any other suitable structure.

A lightweight modular housing for dissipating heat contained in energized waveforms passing therethrough can be formed in accordance with the principles herein. The housing can be formed of any suitable material, such as, for example, at least one of a metallic foam and an organic foam. The housing can further include an electrical component integrally formed with an interior surface of the housing.

Examples of suitable electrical components include, but are not limited to, for example, a suspended conductor, a strip-line conductor, a coaxial conductor, a combiner, a splitter or any other suitable structure.

A low mass electrical structure constructed in accordance with the principles herein can include a heat dissipating foam material first housing section. A heat dissipating foam material second housing section can also be provided, if needed, to increase the cooling capabilities of the structure. The second housing section can be adapted and constructed to couple to the first housing section. An electrical component can be joined to an interior surface of at least one of the first housing section and the second housing section of the low mass electrical structure.

The first housing section of the low mass structure can include a cavity. The electrical component can be joined to at least one of the interior surface of the cavity and the interior surface of the second housing section.

The second housing section of the low mass structure can also include an identical cavity to the cavity of the first housing section.

The electrical component can be joined to interior edge surfaces of the first and second housing sections.

The electrical component can include a conductor, a strip-line conductor, a coaxial conductor joined to the interior surface via a conductor suspension mechanism, and/or at least one of a filter, an amplifier, and a combiner.

In an embodiment, a low mass structure having an electrical component can include a combiner connected to a center conductor to form a combination, the combination joined to the interior surface via a combination suspension mechanism.

A method in accordance with the principles herein can include providing a first housing section made of foam. The method can further include providing a second housing section made of foam. The method can also include fusing the first housing section to the second housing section to form a fused housing, while encapsulating an electrical component within the fused housing, wherein the electrical component is joined to an interior surface of the housing.

Thus, in accordance with the principles herein, a lightweight waveguide module for transmitting signals therethrough can be formed of a heat dissipating foam outer structure.

The lightweight waveguide module can further include an encapsulated conductive channel.

In an embodiment, the lightweight waveguide module can include an electrical component integrally formed within the module.

The electrical component of the lightweight waveguide module can further include at least one of a filter, an amplifier, and a combiner.

The lightweight waveguide module can be formed of a metallic foam.

A lightweight module for transmitting electromagnetic energy in the range of dc to several THz formed of a suitable material, such as a metallic foam or laminate can also be constructed in accordance with the principles herein.

The lightweight module can further include a lightweight insulating exterior and a plated conductive interior channel.

The lightweight module can further include a center conductor.

The center conductor of the lightweight module can include a strip-line conductor.

A method according to the principles herein can include depositing a plating material into a mold. For example, a foam polymer can be poured into the mold to form a plated foam section for a structure. The plated foam structure can be removed from the mold without etching the section from the mold. The mold can be formed with stainless steel, for example. The plating material can be selected from the group consisting of silver, copper, and gold, or from any other metal with the exception of titanium.

Unique structures are realizable in accordance with the principles herein due to the materials and assembly methods set forth.

BRIEF DESCRIPTION OF THE DRAWINGS

Features of exemplary embodiments of the concepts set forth herein will become apparent from the description, the claims, and the accompanying drawings in which:

DETAILED DESCRIPTION

Figure 1:
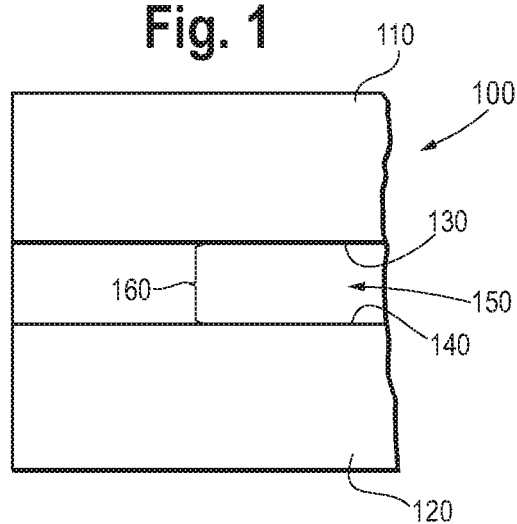
FIG. 1 is a sectional view of an exemplary lightweight structure.

A method and/or structure in accordance with the principles herein provides for the realization of unique structures, such as low loss, low mass precision microwave, millimeter wave, RF structures, modular structures and modular components or other suitable structures.

In accordance with the principles herein, suitable modules, such as, for example, hermetic modules, non-hermetic modules, backplanes/baseplates, RF structures, transmission lines and beam forming networks (BFN) or beam steering networks (BSN), or any other suitable structure can be formed overcoming the lack of flexibility and difficulties in formation of known structures.

For example, hermetic modules can be formed that can include active or passive components embedded internally, such as, for example, coaxial inputs, outputs, and/or interconnects; waveguide inputs, outputs, and interconnects with hermetic windows; combinations of coaxial and waveguide inputs, outputs, and/or interconnects; embedded absorbing materials; embedded magnetic materials; embedded dielectric materials; embedded thermally conductive materials;

multiple modules stacked in the Z direction with coax or WG interconnects; and/or multiple modules in a plane with hermetic and/or non-hermetic interconnects.

Any suitable combination of elements defining a hermetic module, constructed in accordance with the principles herein, can also be applied to a suitable non-hermetic module, with the obvious exception that the non-hermetic module would not be sealed. A non-hermetic module can further include components mounted externally to a lamination/housing, such as, for example, WLP (wafer-level packaging), BGA (ball grid array), etc.; and/or waveguide and/or coaxial input/out/interconnects without hermetic windows, or any other suitable combination of elements.

Further, suitable backplanes or baseplates can be constructed in accordance with the principles herein. These structures can be laminated to strong structural supporting layers formed of, for example, solid metal, or, for example, to other modules, or to any other suitable structure. They can further include routing of RF and non-RF signals from one module to another or from a module to any other suitable receiving structure.

Additionally, suitable RF modules or structures, such as, for example, transmission lines, filters, resonant cavities, waveguide structures including magic Tees, splitters, hybrids, filters, couplers or directional components, coaxial splitters and combiners, or any other suitable RF structure can be achieved in accordance with the principles herein.

Moreover, a beam forming network (BFN) and/or a beam steering network (BSN) can be formed in accordance with the principles herein, wherein modules can be selectively adhered to each other and/or to other structures to form the BFN and/or the BSN.

Structures constructed in accordance with the principles herein can serve functional roles in the transmission of signals, such as, for example, transmission, attenuation, isolation, load termination, filtration, and radiation to name a few. For example, waves having electromagnetic energy between DC and several THz, wherein the energy level is defined by the waveguide size, conductor size, and other various factors, can be transmitted wherein propagation of the waves is controlled and conducted, at least in part, by a structure configured in accordance with the principles herein.

Further, signals can be attenuated based on a predetermined reduction in amplitude of electromagnetic energy between DC and several THz, at least in part, by a structure configured in accordance with the principles herein.

Signals can also be isolated, i.e., coupling prevented, between more than one electromagnetic field between DC and several THz, at least in part, with a structure constructed in accordance with the principles herein. Additionally, load termination, filtration, or reduction in amplitude, and the direction and polarization of radiation generated within the structure can be controlled by selecting components and structural features to achieve these objectives.

In accordance with the principles herein, a wide variety of modules, such as an embodiment of a module illustrated generally at 100 in FIG. 1 can be formed. The module 100 is formed of a suitable lightweight material, such as a lightweight metal or organic foam, and can be combined with other modules and/or components for forming a BFN, BSN, or other structure, such as, for example, a transmission structure. First and second lightweight sections 110, 120 can include inner conductive surfaces 130, 140. When the sections 110,120 are brought together by a suitable method, such as, for example, by fusing, a conductive cavity 150 is formed therein. The conductive cavity 150 can be configured to carry energized signals therethrough such as, for example, when the conductive surfaces 130, 140 are adapted to integrate upon combining the sections 110, 120 to form an electrical component 160 suitable for conducting signals, and/or for forming a beam transmitting network.

Figure 2:
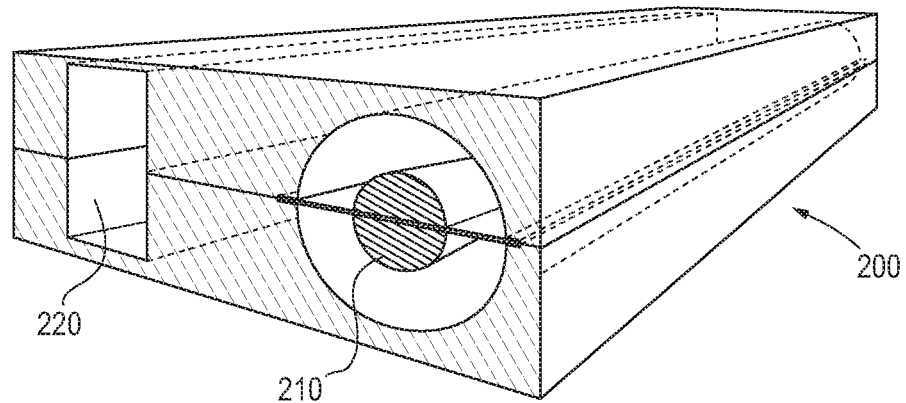
FIG. 2 is a perspective view of an exemplary embodiment of a structure, wherein a waveguide and a coaxial transmission line are both incorporated into a single structure.

Various other embodiments, not limited to the configurations or purpose of the illustrated modules and structures, such as module 100 illustrated in FIG. 1, that are suitable for forming laser transmission networks can be formed in accordance with the principles herein. One such embodiment, for example, is a module shown generally at 200 in FIG. 2, formed and adapted to accommodate both a suspended waveguide 220 and coaxial transmission line 210 in a lightweight shell housing. A suitable housing material for the module 200 can include, for example, a metallic foam, such as aluminum foam, or any other suitable lightweight material, such as a non-metallic lightweight material with conductive material selectively applied, such as by plating or depositing, or by any other suitable method, where electrical conduction is needed.

Figure 3:
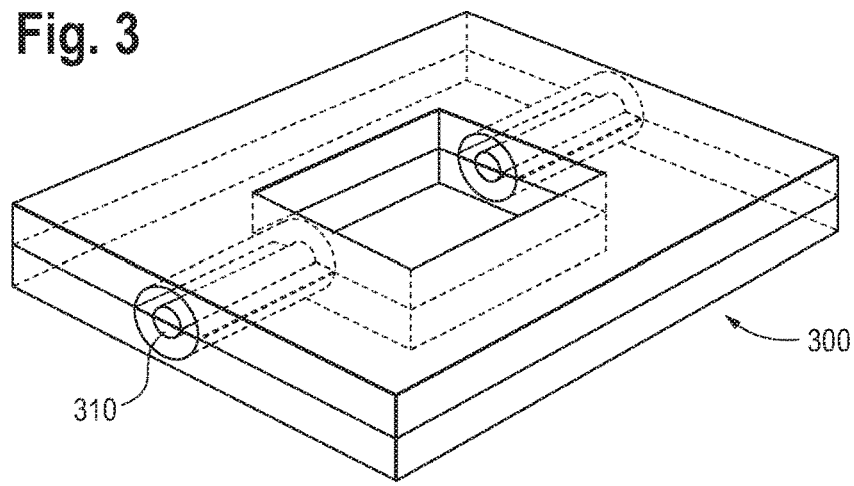
FIG. 3 is a perspective view of an exemplary embodiment of a structure including a transmission line and an encapsulated cavity.

In another embodiment, a module constructed to accommodate a coaxial transmission line 310 can be provided, such as, for example, the module shown generally at 300 in FIG. 3 in accordance with the principles herein.

Figure 4:
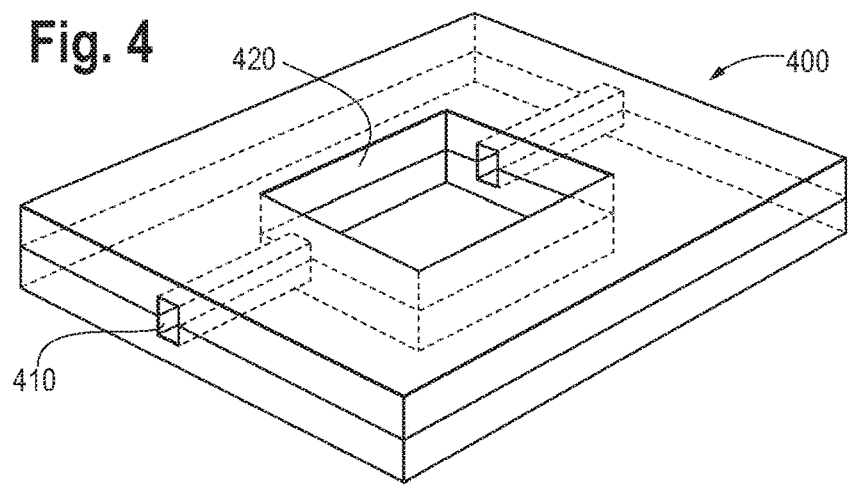
FIG. 4 is a perspective view of an exemplary embodiment of a structure including a waveguide and an encapsulated cavity.

In yet another embodiment, a module, illustrated generally at 400 in FIG. 4, can include, for example, a waveguide transmission line 410 for conducting signals to a cavity 420. The cavity 420 can also be configured to accommodate an electrical component, such as, for example, a Microwave Monolithic Integrated circuit (MMIC) Chip.

Figure 5:
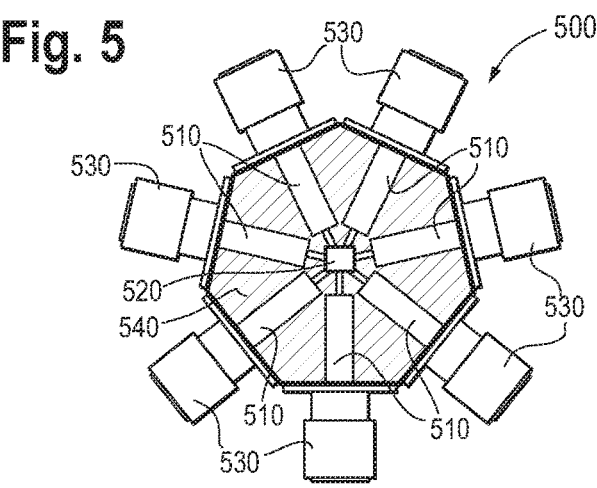
FIG. 5 is a top view of an exemplary embodiment of a structure including a six-way beam splitter.

In still another embodiment, a six-way beam splitter can be constructed such as, for example, a module shown generally at 500 in FIG. 5 in accordance with the principles herein. The module 500 can include coaxial lines 510, operatively connected to a six-way beam splitter 520. The coaxial lines 510 can be secured to the module 500 with coaxial connectors 530. The module can include a lightweight foam inner core 540 formed about the components of the module 500, or through which the components can be assembled, wherein, for example, the foam core is prefabricated to accommodate assembly of the components, such as the coaxial lines 510. Alternatively, the module 500 can be formed in a suitable plated mold such as, for example, a stainless steel mold, or any other suitable mold.

Figure 6:
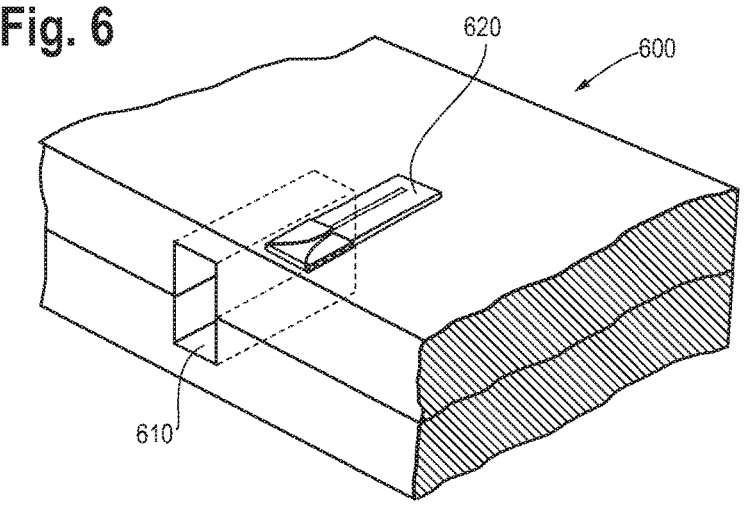
FIG. 6 is an exemplary embodiment of a structure encapsulating components for a waveguide and a microstrip.

A module constructed in accordance with the principles herein can include, for example, a waveguide 610 to microstrip transition 620 formed of a suitable lightweight material as illustrated generally, for example, at 600 in FIG. 6.

Figure 7:
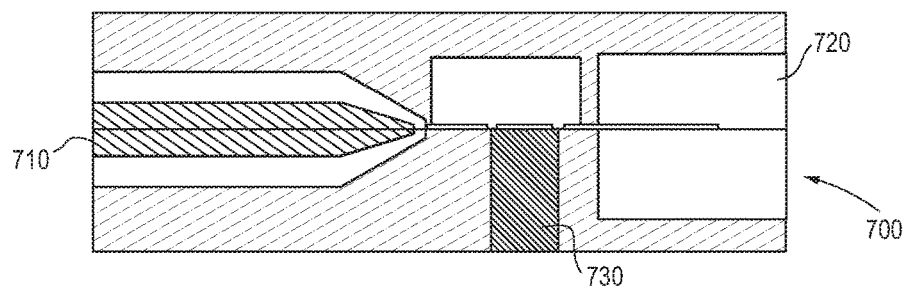
FIG. 7 is a sectional view of an exemplary embodiment of a connector structure.

A module constructed in accordance with the principles herein can form a connector, such as, for example, a connector shown generally at 700 in FIG. 7. The connector 700 can include a coaxial input 710, a waveguide output 720, and a thermal dissipation device, such as, for example, a copper slug 730 operatively connected to the coaxial line and the waveguide line.

Figure 8:
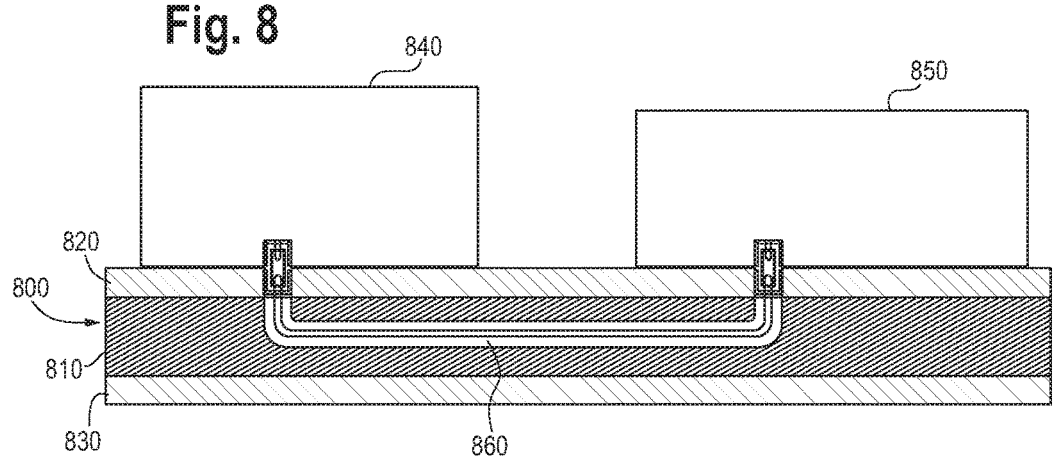
FIG. 8 is a sectional view of an exemplary embodiment of a backplane structure.

As illustrated in FIG. 8, an embodiment of a backplane module constructed in accordance with the principles herein is shown generally at 800. The backplane module 800 includes a main body portion 810. The main body portion 810 can include, for example, laminates such as a first laminate 820 and a second laminate 830. The first and second laminates can be formed of a suitable material, such as, for example, carbon laminates, or circuit board laminates. A transmission line 860 for RF signals can be formed through the first laminate 820 and the main body portion 810 for routing RF signals from a first device 840 to a second device 850, or vice versa. In this embodiment, the backplane module 800 serves to both route the RF signals and as a structural element.

Figure 9A:
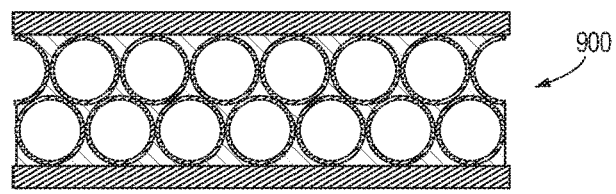
FIGS. 9a-9e illustrate steps for fabricating exemplary open-core structure.
Figure 9B:
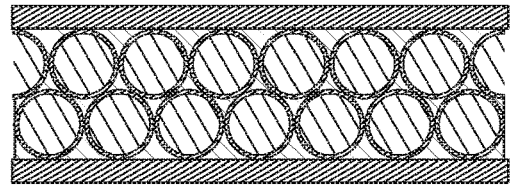
Figure 9C:
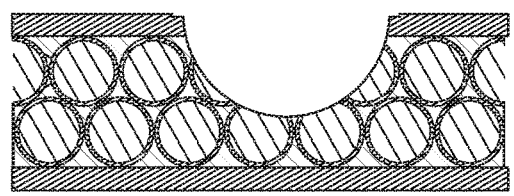
Figure 9D:
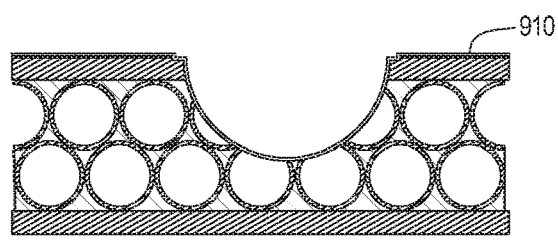
Figure 9E:
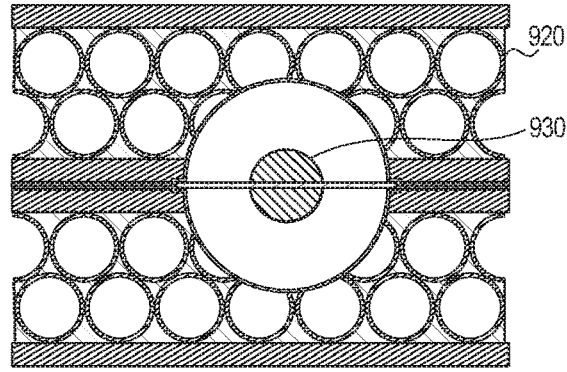
Figure 10:
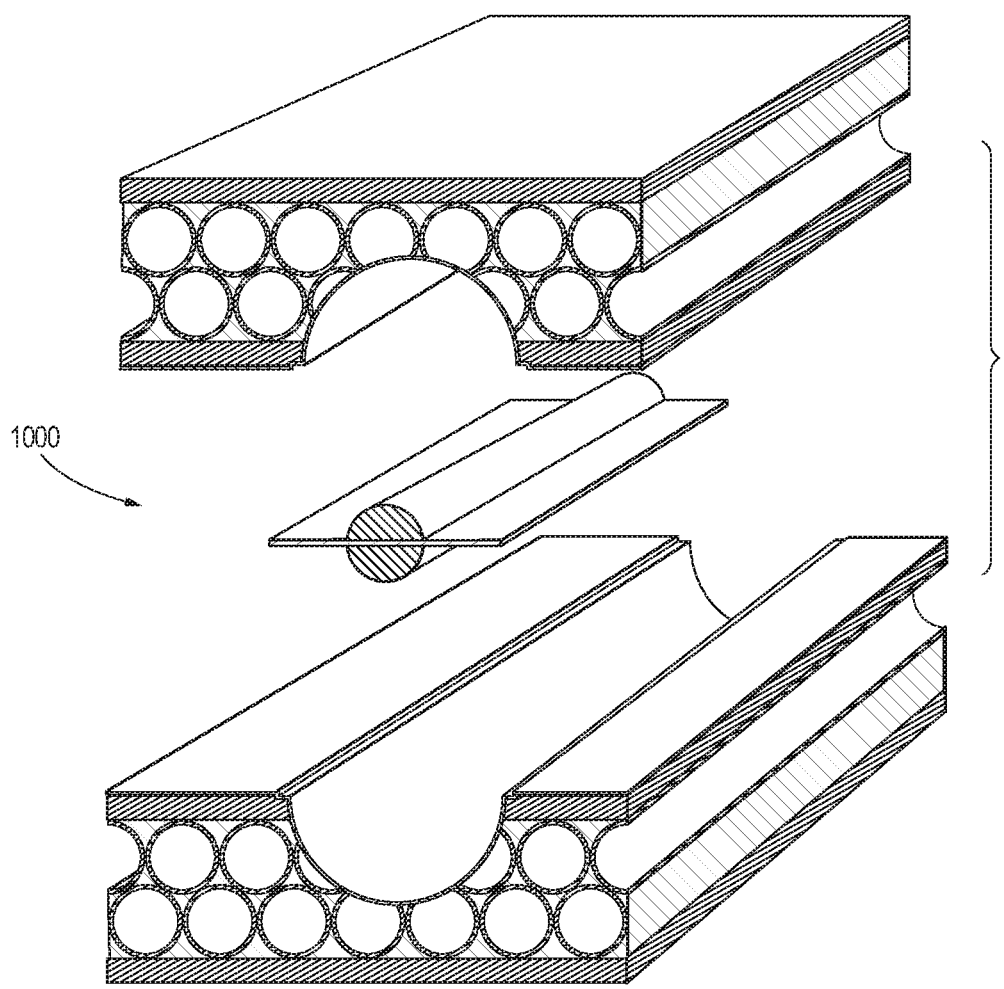
FIG. 10 illustrates an exemplary embodiment of an open-core structure with a supported center conductor.

FIGS. 9a through 9e illustrate an embodiment of lamination of solid and open-core materials in accordance with the principles herein. As illustrated in FIG. 9a an open core module 900 can be provided in a first step. The open cores of the module 900 can then be filled with any suitable material, such as, for example, machining waxes, polyesters and photo resists as illustrated in FIG. 9b. In one embodiment, the photo resist is an epoxy-base negative photo resist such as SU-8. The filling material both provides stability for machining the open core material and facilitates electroplating. It is subsequently removed as shown in FIG. 9d. The module 900 can then be machined to form one half or a coaxial structure as shown in FIG. 9c. Plating 910 can be applied to the machined module, as illustrated in FIG. 9d. A completed module can then be formed by connecting another module 920 which has been processed in the same way to the module 900, wherein a supported center conductor 930 is connected to the plating 910 to form a module assembly 1000, shown in an exploded view, for example, in FIG. 10.

Figure 11A:
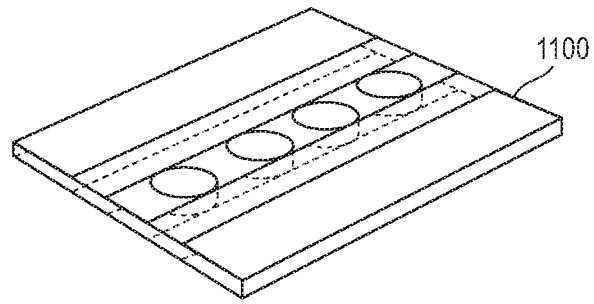
FIGS. 11a-11c illustrate steps for fabricating an exemplary center conductor.
Figure 11B:
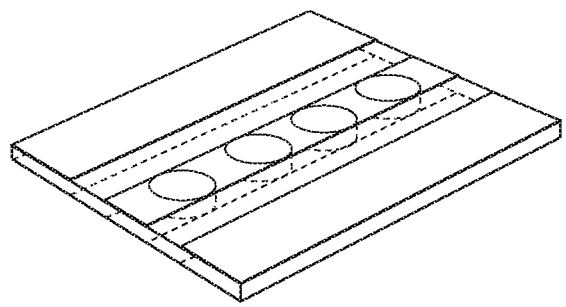
Figure 11C:
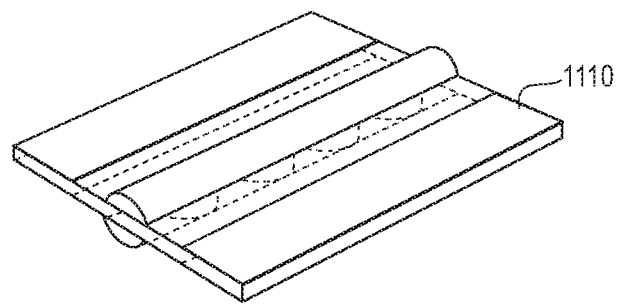

In yet another embodiment, a suitable supported center conductor can be formed, for example, as illustrated in FIGS. 11a-11c. First, a printed circuit board 1100 or other suitable structure, such as a housing, frame, or heat sink, can be provided with vias connecting top and bottom traces. Next, silver plating can be applied to the printed circuit board 1100 in FIG. 11b. The silver can then be plated up to form a cylindrical profile conductor 1110, as illustrated, for example, in FIG. 11c.

Figure 12:
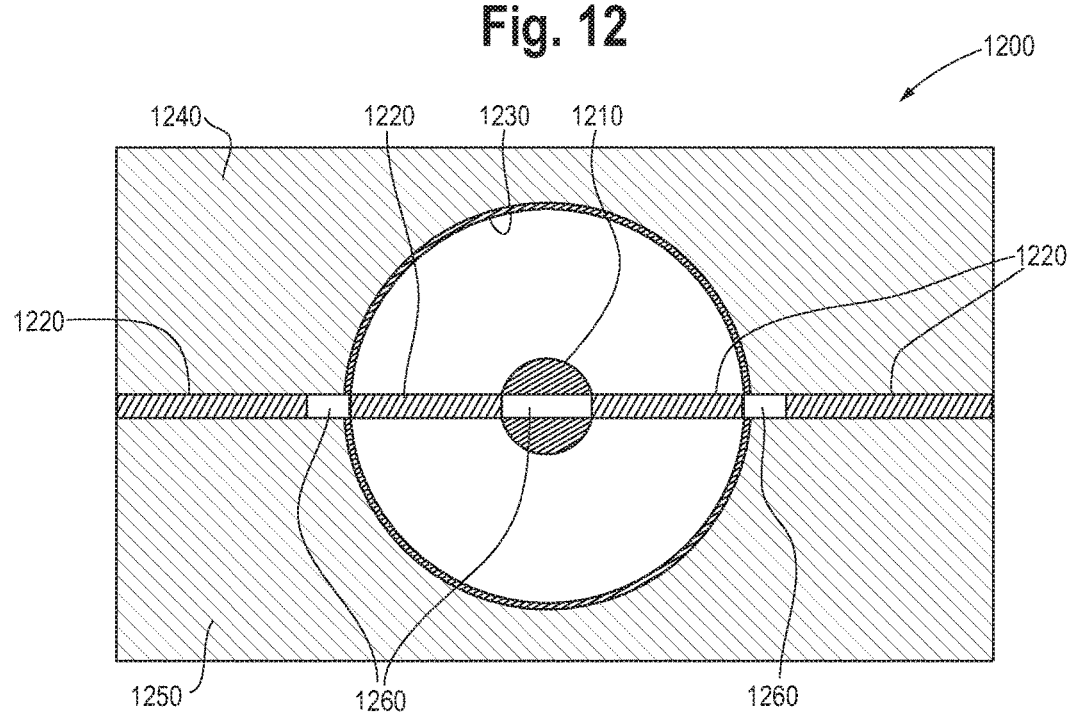
FIG. 12 illustrates an exemplary structure incorporating a suitable cylindrical profile conductor.
Figure 13:
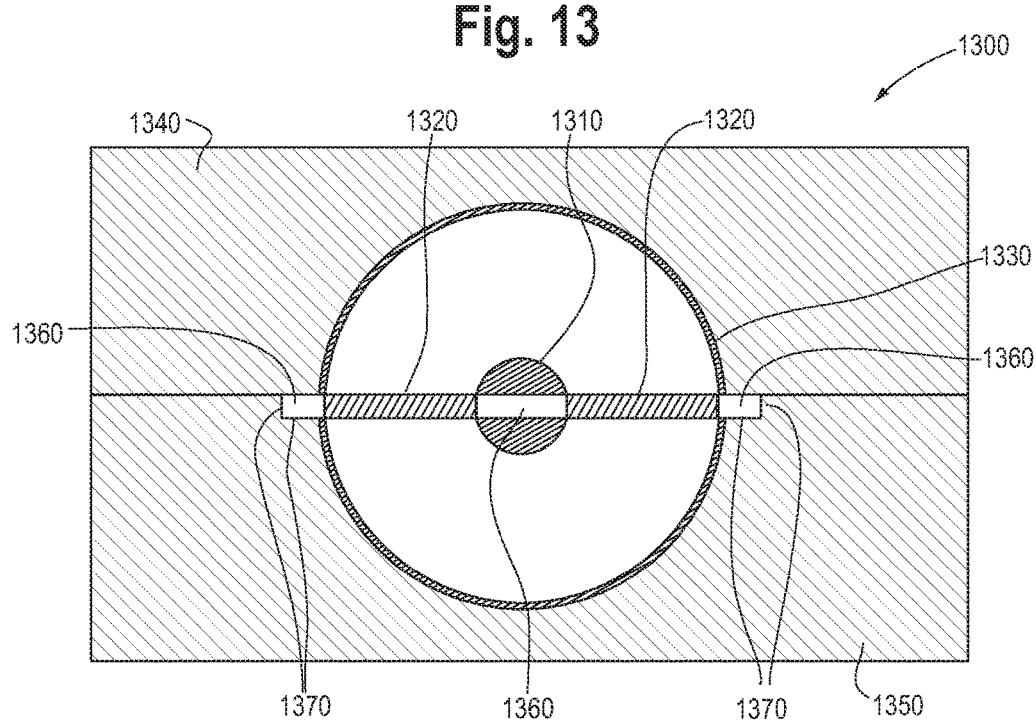
FIG. 13 illustrates yet another embodiment of an exemplary structure incorporating a suitable cylindrical profile conductor.

FIG. 12 illustrates an embodiment wherein a suitable cylindrical profile conductor, such as the profile conductor 1210 is incorporated into a suitable module, such as the module shown generally at 1200. The profile conductor 1210 can be formed of a suitable material, such as, for example, silver, copper, gold or any other suitable material or composite on, for example, a printed circuit board 1220. The module 1200 is formed of a suitable material, such as a first metallic foam section 1240 and a second metallic foam section 1250. One suitable metallic foam, for example, is aluminum foam. Plating can be provided along the module, such as plating 1230, and can be formed of a suitable material or composite, such as silver. Vias 1260 can be included to provide functionality for the device.

Alternatively, a module 1300 formed of a suitable metal or organic foam can include a center conductor 1310 formed on a diaelectric 1320. A conductive surface 1330 is formed within a first organic foam section 1340 and a second organic foam section 1350. Further, recesses 1370 are provided within the second organic foam section to accommodate a pc board formed of a dielectric 1320 and vias 1360.

Figure 14:
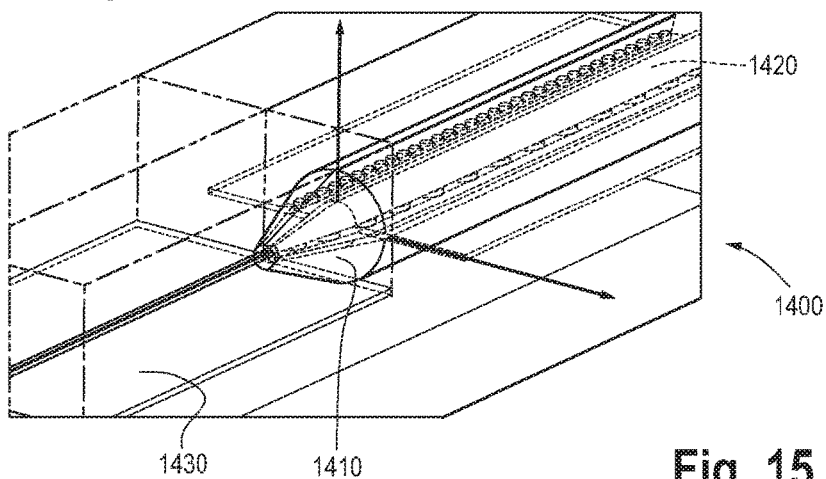
FIG. 14 illustrates an exemplary embodiment of a structure encapsulating a suitable linear taper transition element.
Figure 15:
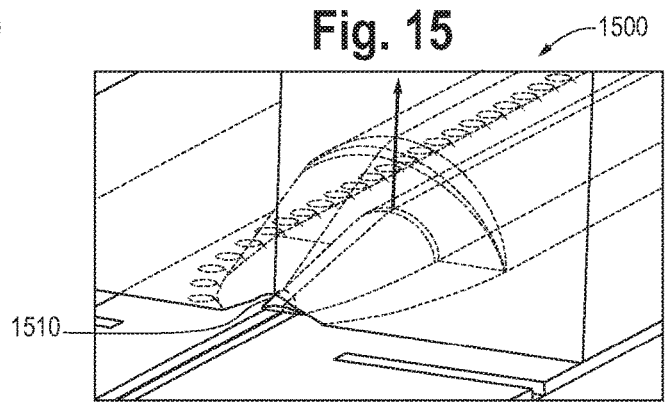
FIG. 15 illustrates an exemplary embodiment of a structure encapsulating a suitable reduced depth of cut round profile taper transition element.

In accordance with the principles herein two types of tapered transitions from a coaxial line to a microstrip transmission line are shown in FIGS. 14 and 15 respectively. FIG. 14 depicts a module illustrated generally at 1400 which can provide an exemplary, effective transition from a coaxial line 1420 to a microstrip transmission line 1430 with a suitable taper transition, such as, for example, a conical linear taper transition of an outer conductor 1410, as illustrated in FIG. 14. The conical linear taper transition with unequal radius outer conductor cones yields the highest performance in operation. It is also difficult to make this version of a tapered coaxial transition.

Figure 16:
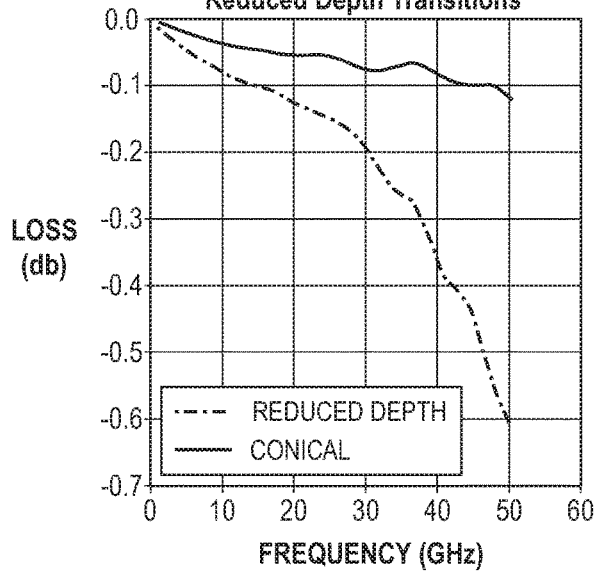
FIG. 16 illustrates graphically simulations of insertion loss data for the exemplary structures of FIGS. 14 and 15.

Alternatively, a reduced depth of cut round profile taper transition 1510 can adequately provide a suitable coaxial to microstrip transition, as illustrated with a module shown generally at 1500 in FIG. 15. The transition 1510 is easier to manufacture, but of lower performance than the conical linear taper of the outer conductor, as shown graphically in FIG. 16 which uses a finite element method solver for electromagnetic structures to depict the achievable performance of the structures of FIGS. 14 and 15. In particular, FIG. 16 shows the loss (in dB) per inch of transmission through structures when operated at different frequencies (in GHz). The structure of FIG. 14 is shown as a solid line while the structure of FIG. 15 is shown as a dashed line. Moderate performance can be achieved with the embodiment of FIG. 15 below 30 GHz.

Figure 17A:
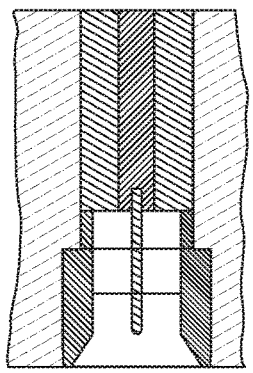
FIGS. 17a-17d illustrate exemplary connector transitions for an embodiment of an exemplary structure.
Figure 17B:
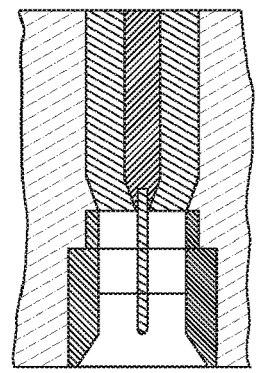
Figure 17C:
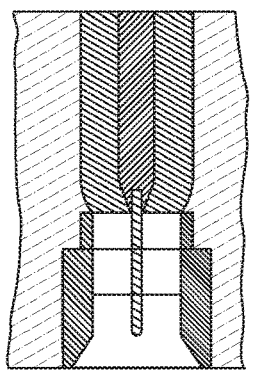
Figure 17D:
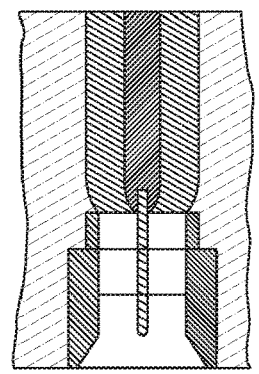
Figure 18:
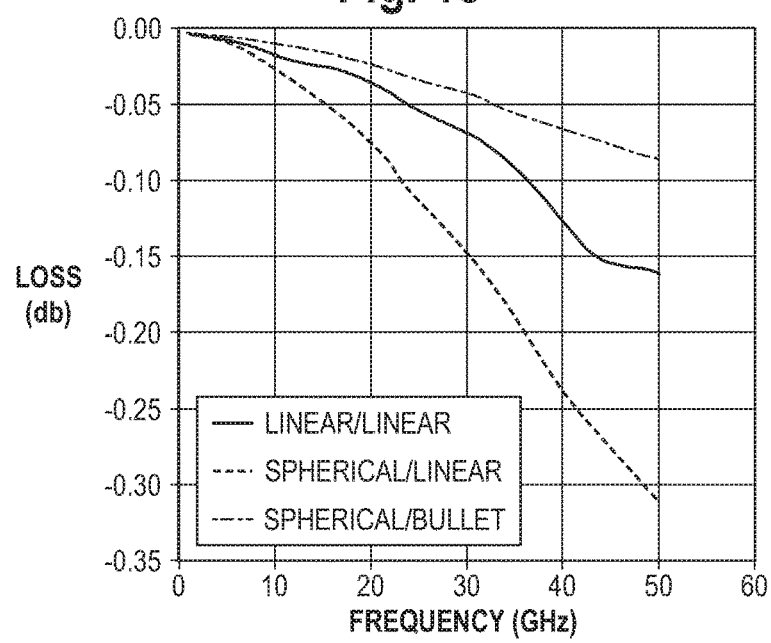
FIG. 18 illustrates graphically performance simulations of the various exemplary connectors of FIGS. 17a-17d.

Further, achieving an efficient connector transition from a coaxial air-line to a suitable coaxial connector, such as, for example, an MSSS connector, or a connector specification, can be achieved in a number of ways. A few exemplary embodiments are illustrated in FIGS. 17a-17d. FIG. 17a depicts a straight connection. This transition has a large discontinuity resulting in poor performance. A linear-linear taper transition is shown in FIG. 17b. This transition is achieves a moderate performance level as shown by the solid line in FIG. 18. FIG. 17c depicts a spherical-linear transition exhibits poor performance, as shown by the dashed line of FIG. 18. Finally, FIG. 17d depicts a spherical-bullet taper which shows a superior performance in FIG. 18.

Figure 19:
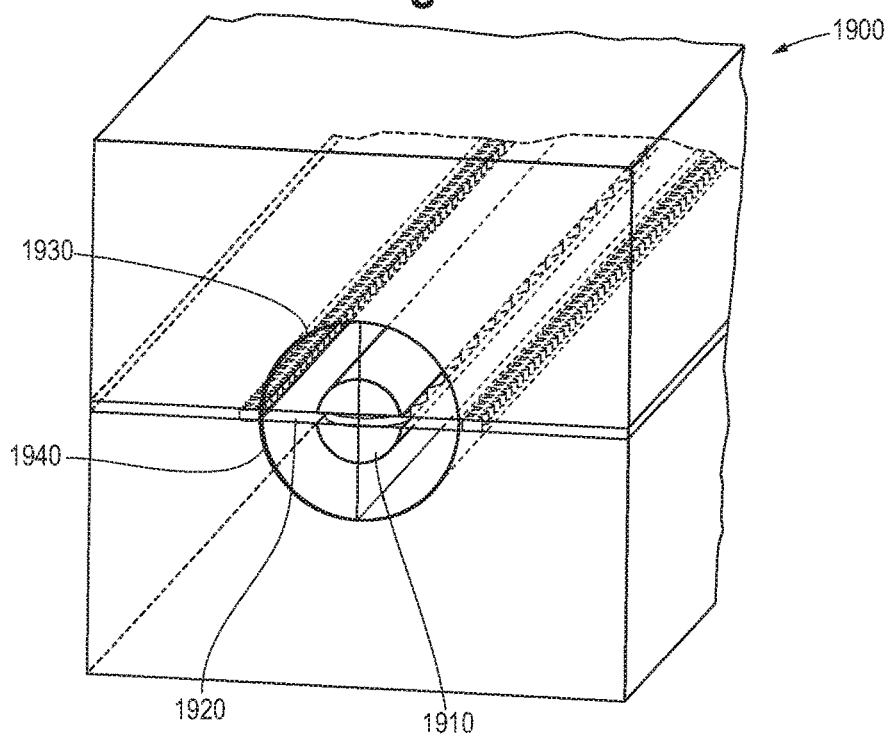
FIG. 19 illustrates an exemplary structure including a co-axial air line formed with a rounded center conductor suspended by a thin, low-dielectric element.

As illustrated in FIG. 19, a module 1900 can include a co-axial air line formed with a rounded center conductor 1910 suspended by a thin, low-dielectric element, such as, for example, a printed circuit board 1920. An outer conductor of the air line is formed by machining and plating a top half 1930 and a bottom half 1940 of the module 1900.

Figure 20:
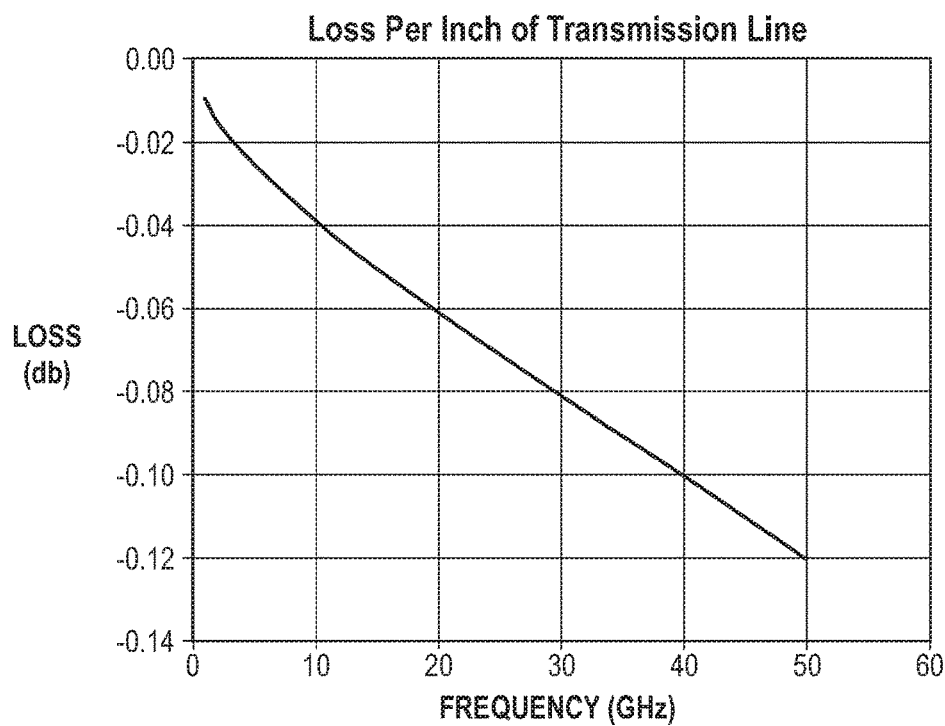
FIG. 20 illustrates graphically simulations of the loss per inch of a transmission line through the co-axial air line formed as shown in FIG. 19.

The performance of structures achievable with the present invention has been simulated using a finite element method solver for electromagnetic structures. FIG. 20 illustrates graphically an exemplary chart of the loss (in dB) per inch of transmission through the co-axial air line formed as shown in FIG. 19 when the co-axial line is operated at different frequencies (in GHz). In other words, FIG. 20 depicts how strong of an electrical propagation the structure of FIG. 19 can support.

Figure 21:
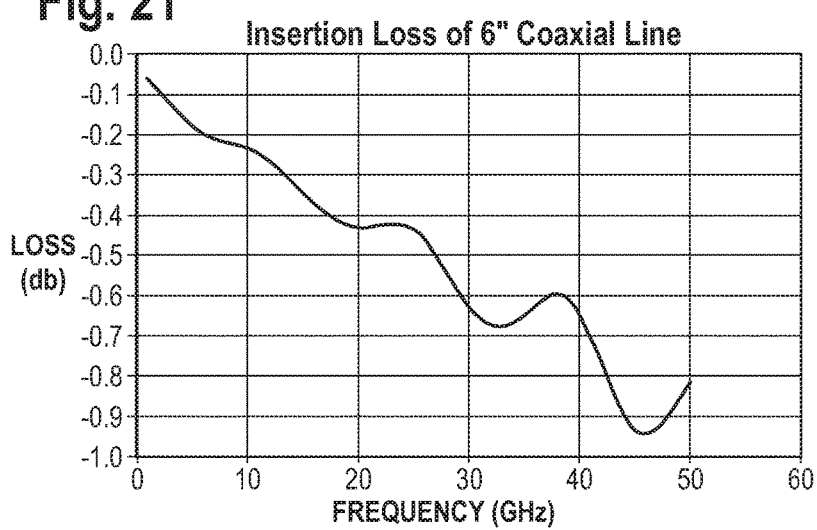
FIG. 21 illustrates graphically simulations of the loss of the transmission line plus the loss of transitions from a coax to a connector of a 6" coaxial line.
Figure 22:
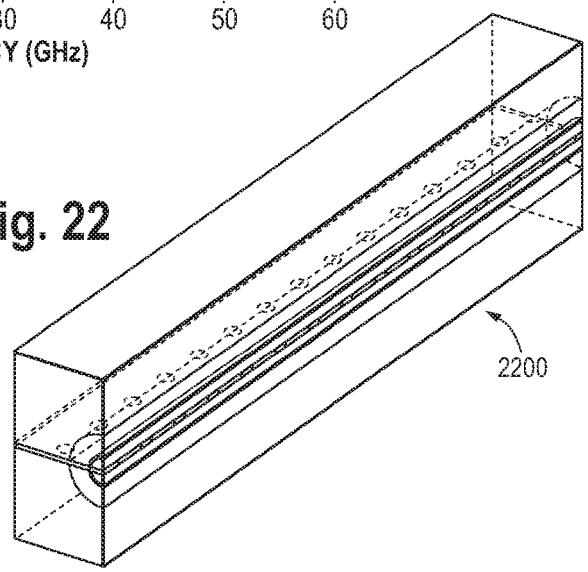
FIG. 22 illustrates an exemplary embodiment of a structure including a co-axial air line with increased via diameter compared to the exemplary structure of FIG. 19.
Figure 23:
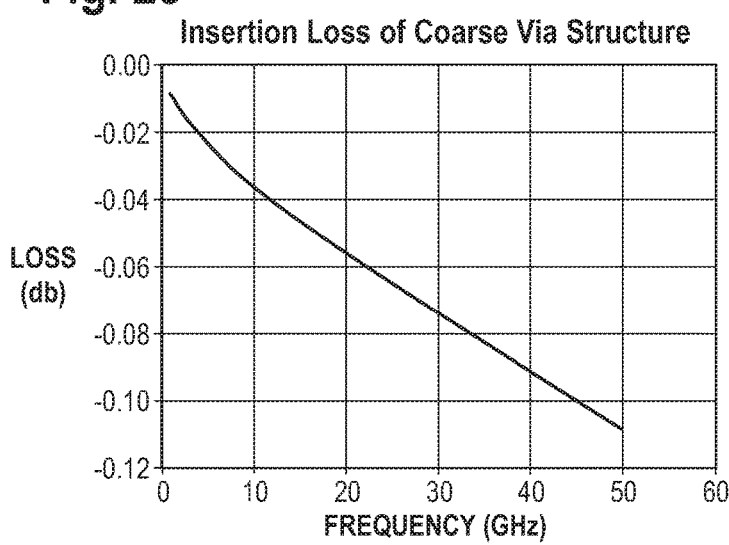
FIG. 23 illustrates graphically simulations of the resulting insertion loss obtained with the modified via diameter of FIG. 22.

FIG. 21 illustrates the loss (in dB) of the transmission line plus the loss of transitions from a coaxial to a connector of a 6" coaxial line. An alternative embodiment is shown in FIG. 22, with increased via spacing and consequently the via diameter as compared to the structure in FIG. 11a in a structure shown generally at 2200. Similarly to FIG. 20, FIG. 23 depicts loss per inch (in dB) per frequency (in GHz) of the embodiment of FIG. 22.

Figure 24:
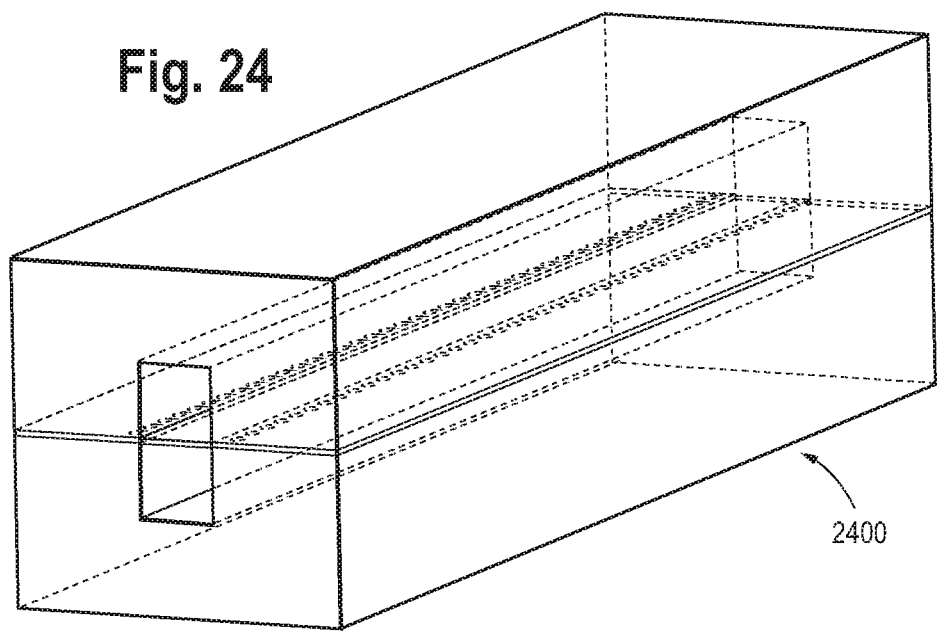
FIG. 24 illustrates an exemplary structure encapsulating a waveguide formed with a suspended dielectric therein.
Figure 25:
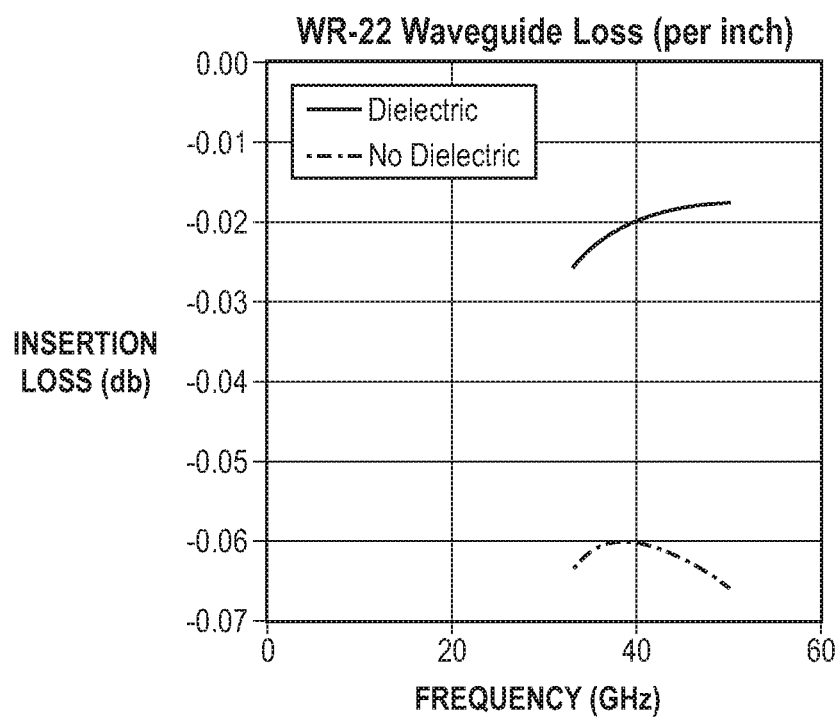
FIG. 25 illustrates graphically simulations of waveguide loss per inch achieved in an exemplary waveguide structure with and without the dielectric element of FIG. 24.

Further, in accordance with the principles herein, a waveguide, such as, for example, a WR-22 (Q-band) Waveguide 2400, illustrated in FIG. 24, can be simulated using the same construction technique as the coaxial air-line of FIG. 19. Similarly to FIGS. 20 and 23, FIG. 25 illustrates graphically the WR-22 waveguide loss (in dB) per inch per frequency (in GHz) for both embodiments having a dielectric inside the waveguide, shown as a solid line, and for embodiments without a dielectric inside the waveguide, shown as a dashed line.

In accordance with the principles herein, aluminum foam, or other suitable metallic foam or other low-density cellular or non-cellular organic or inorganic rigid bulk material, can be employed in microwave/millimeter wave applications in place of known, heavy supporting structures. As a result, the weight of such structures, as well as the loss/frequency dispersion, is drastically reduced for beam-forming networks (BFN) constructed in accordance with the above principles. Further, cage structures that can serves as backplanes for units to be inserted in modules can be formed in accordance with the principles herein.

A number of varied structures can be formed, and can serve to form network modules for transmitting signals, or can interface with other units. In other words, other technologies, such as Wafer Level Packaging (WLP) can be accommodated according to the principles herein. Further, all structures that are possible with microstrip can be achieved, and can realize a very low insertion loss as well. Thus, both weight and cost are significantly reduced in accordance with the principles herein.

Further, the amplification needed to overcome the loss of phased arrays, as they mature, is substantially reduced in accordance with the principles herein. All manner of microwave circuits can be realized in a very low loss medium. When the material includes foam or has characteristics of a foam, the porous nature of the material eliminates scattering off the surface, thus minimizing reflections in a cavity. As a result, lighter, less expensive boards with reduced transmission loss are achieved.

In accordance with the principles herein, lightweight material, such as foam, serves as a useful structure for low loss RF propagation. Further, using a very thin, low dielectric board results in a coaxial structure having near true coaxial transmission lines characteristics, and is further supported by a very strong, lightweight material. This is particularly important given the long distances traveled by a large array BFN.

In accordance with the principles herein, structures suitable for various modes of signal transmission can be realized for electromagnetic waves of frequencies between DC and several THz, such as, for example, a planar transmission line between two ground planes, separated by a dielectric (stripline); a planar transmission line between two ground planes, separated by air (suspended stripline); a planar transmission line with one ground plane separated by a dielectric (microstrip); a planar transmission line with one ground plane separated by mostly air (suspended microstrip); a slot line; a fin-line; a coaxial transmission line with round, oval, rectangular or square profile; a waveguide with round, rectangular or oval profile; ridged waveguides; coplanar waveguides; beam waveguides; DC connections; and dielectric loaded waveguides, or any other suitable or desired signal transmission structure, where light weight and low loss are desired structural characteristics for signal propagation.

Numerous suitable applications of the principles herein can be achieved. For example, low loss transmission lines (waveguides, coaxial, etc. as listed above); controlled loss transmission lines (attenuators); terminations; housings for electronic circuits; housings for electronic circuits that function as DC and RF interconnects as well; mechanical mounting structures for modules; mechanical mounting structures for modules that also function as DC and RF interconnects; housings for electronic circuits featuring selectively absorptive sections; housings for electronic circuits featuring a high degree of electrical shielding; housing for electronics that allow for cooling through the flow of gas or liquid coolant through the structure; fluid/gas transport integrated into electronics housings; antenna structures including, but not limited to horns, reflectors, shaped surfaces; antenna structures with integrated housings for electronics; arrays of antennas; covers for electronics housings; radomes; radomes with integrated electronics housings or metalized elements; true time delay lines; rotman lens; frequency selective surfaces; mechanisms for routing optical fibers; filters; resonant structures; cavities for oscillators; magic tee hybrids; mechanical waveguide switches; transitions between waveguide types (round, rectangular, elliptical); transitions from waveguide to microstrip; transitions from microstrip to coaxial; and transitions from coaxial to waveguide, to name a few.

A method of forming modules such as a compact housing, transmission line or other structure can include forming a structure from a lightweight support material, such as a metallic foam or laminate. The structure can be formed by, for example, molding a shape, stamping, molding a polymer foam to a plate, or any other suitable method. Stamp mold metalized sponges could be formed of a coated foam, for example, in accordance with the principles herein.

The structure can be filled with, for example, a temporary filler. For example, the structure can be filled to support a resulting foam or semi-foam structure while machining, or to provide a desirable surface configuration for plating. The structure can be machined to form a structure, such as a housing or a transmission line, for example. The structure can be plated with electrically conductive materials, for example, or insulating material, when needed. Further, plating can be employed to create smooth surfaces for signal propagation and selectively keep exposed irregular surfaces, which reduces cavity molding. Filler material can, for example, be removed after plating to return the medium back to an ultra light weight configuration, or, where a light filler material is used, to accommodate the formation of connecting members or transmission lines, and/or connections. Further, additional materials, such as, for example, absorbers, resist or any other suitable material can be deposited to, for example, an irregular foam surface constructed in accordance with the principles herein.

In accordance with the principles herein, structures can be formed using pourable foam materials, preformed foam plates, or any other suitable foam structure. For example, one exemplary method for forming a structure can include electroplating a suitable mold, such as, for example, a stainless steel mold or a mold formed of any other suitable material with a suitable plating material, such as, for example gold, silver, copper or most metals other than titanium, to form a plated mold. A polymer foam mixture can then be poured into the mold. The polymer foam mixture adheres to the plating, but can be lifted directly from the mold without requiring an etching step to remove the mold from the foam and plating.

Additional steps can include, for example, installing additional components, laminating pieces together to form units, modules and/or housings. Further, parts can be attached in and on the structure, such as for example, by laminating two halves together with, for example, a suitable adhesive, a solder, diffusion bonding, or any other suitable method. Further, finline components can be laminated into the structure, if desired.

Where the support material is, for example, a lightweight foam, an open cell polymer can be metalized to achieve similar performance metrics as a metallic foam, for example.

A porous foam further includes inherent thermal properties that can be achieved by flowing air through the material, or by using the material where a natural air flow is present, such as at high altitudes. An organic foam can provide desired insulating properties for a structure. Further, a thermal medium can be driven through the structure during operation for controlling temperature characteristics, such as, for example, air or a suitable fluid, such as water or a coolant, in accordance with principles of thermodynamics and avionics.

Figure 26:
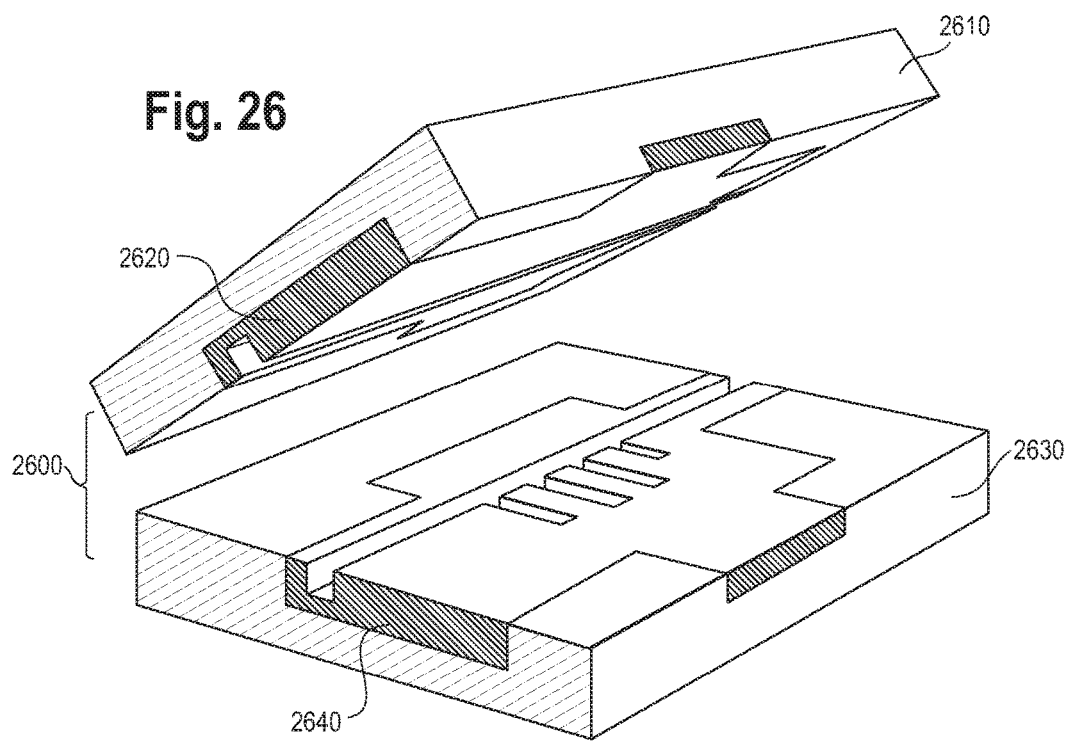
FIG. 26 illustrates an exemplary embodiment of an electrical structure with an internal electrical component applied to multiple combinable sections of the structure.

Structures formed in accordance with the principles herein can take advantage of using a suitable preformed foam, such as, for example, a suitable organic or metallic foam. Open cell metallic foams in the range of a 10% density factor for materials, such as aluminum, provide light weight structures with adequate mechanical stiffness and good plating adhesion surfaces. The open cell construction of these foams enables RF mode suppression surfaces for fragmenting RF cavity modes. Likewise, organic materials such as, for example, ECCOSTOCK FPH® provide good strength to weight ratios, as well as good adhesion to plating and properties suitable post plating. Materials need to withstand temperatures above 150° C. and pressures of 300 psi for bonding of the halves. Electrical components can be formed on a surface of the foam, and selectively fused, as desired, to one or more additional pieces of foam which may or may not also have an integrated electrical structure, as illustrated, for example, by an exemplary electrical structure shown generally at 2600 in FIG. 26.

Figure 26A:
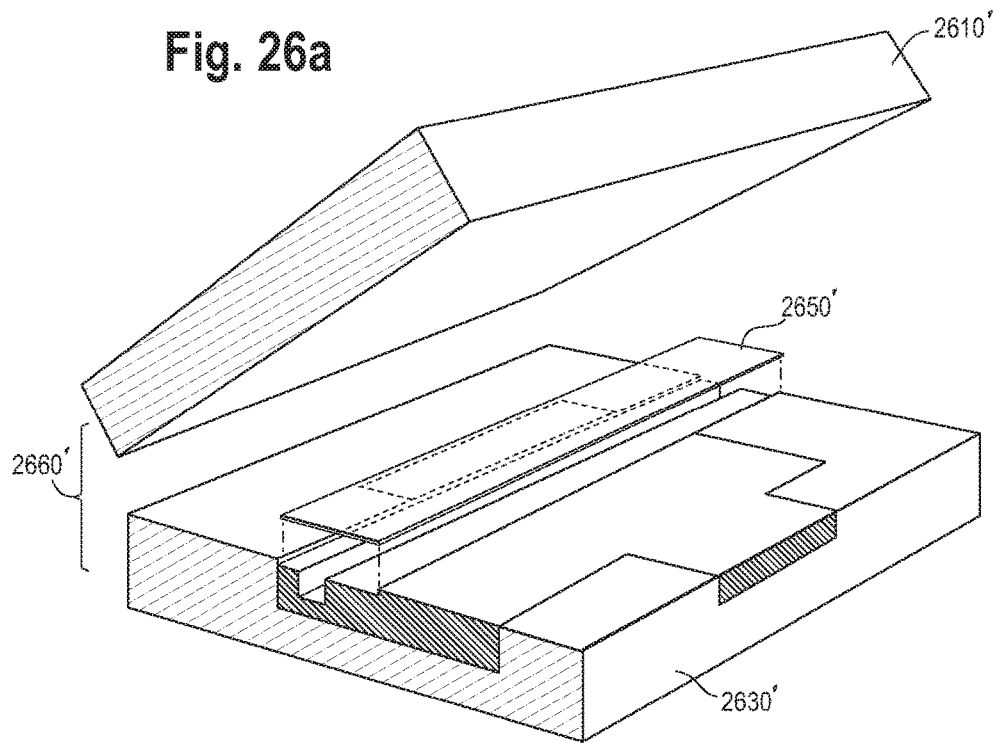
FIG. 26a illustrates an exemplary embodiment of an electrical structure with an internal electrical component applied to one combinable section of the structure and an electrical component sandwiched between combinable sections.

The electrical structure 2600 includes a first foam section 2610 formed of a suitable foam material, and a metallic coating 2620 can be formed thereon. The metallic coating 2620 can take on a partial coating characteristic when applied using deposition techniques, such as masking, or by applying preformed metal sheets, adhered by heating to the structure. A second foam section 2630, formed of a suitable foam material, can be provided, and selectively fused to the first foam section 2610, either directly or indirectly, to form an internal electrical component 2640. The internal electrical component 2640 is thus integrally formed with the electrical structure 2600 where the foam forms an external boundary of the electrical component 2640, and where the conductive surface of the internal electrical component 2640 is formed by combining the foam sections 2610 and 2630. The second foam section 2630 can also include a metallic coating or preformed sheet that serves as a component of the electrical component 2640. Alternatively, as shown in FIG. 26*a*, the first foam section 2610' can sandwich a metal plate 2650' between the first and second foam sections 2610' and 2630', where the second foam section 2630' has a metallic coating or preformed metal sheet applied to an internal surface 2660' of the second foam section 2630'. Such an embodiment may be useful where it is desirable for different foams to be employed for the first and second foam sections.

Figure 27:
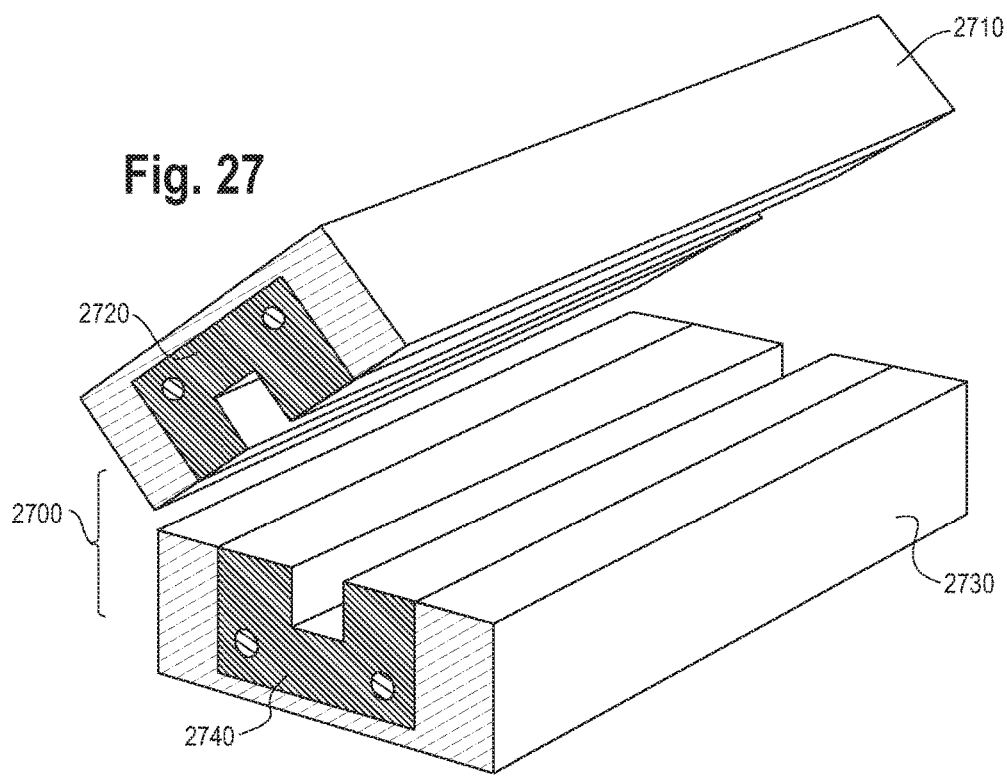
FIG. 27 illustrates an exemplary embodiment of an electrical structure including combinable sections configured to form a waveguide.

As illustrated in an exemplary embodiment shown in FIG. 27, a suitable waveguide structure, shown generally at 2700, can be formed by combining a first foam section 2710 with a second foam section 2730. Each of the first and second foam sections 2710 and 2730 can include a waveguide channel 2720 and 2740, respectively. The waveguide channels 2720 and 2740 can be formed by forming a channel in the foam, such as by cutting the foam, or by fusing foam sections of varied cross section together. The waveguide channels 2720 and 2740 can be plated with preformed metal plates, or by applying a metallic coating using a suitable process, such as painting or a metallic deposition process. The waveguide channel within the waveguide structure 2700 is formed by fusing the first foam section 2710 to the second foam section 2730 such that the waveguide channels 2720 and 2740 are aligned to one another.

Figure 28:
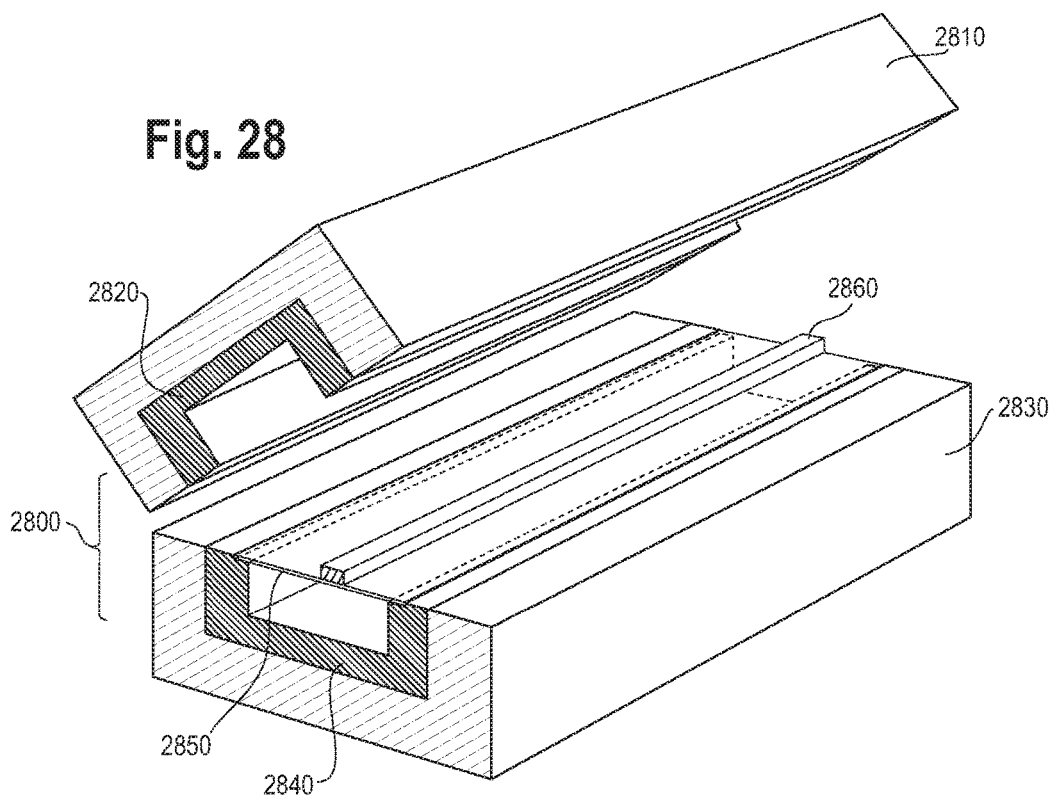
FIG. 28 illustrates an exemplary embodiment of an electrical structure including a suspended conductor on a dielectric.

As illustrated in the exemplary embodiment shown in FIG. 28, a suspended conductor 2860 can be integrally formed with a conductive channel structure shown generally at 2800. The conductive channel structure 2800 includes a first foam section 2810 having a conductive interior surface 2820. A second foam section 2830 is provided, and includes a conductive interior surface 2840. A plate 2850 can be provided that spans a channel 2870 of the second foam section 2830 and a channel 2880 of the first foam section 2810 when the first and second foam sections 2810, 2830, respectively, are fused together. A number of varied embodiments that vary the plate position can be utilized to render the interior surface conductive. The plate 2850 can be formed of any suitable material to both satisfy the electrical requirements of the conductive channel structure 2800, and to directly or indirectly insure adhesion of the suspended conductor 2860. Suitable plates 2850 can include, for example, any plate upon which a metal can be directly or indirectly plated to achieve desired electrical characteristics of the conductive channel structure 2800.

Figure 29:
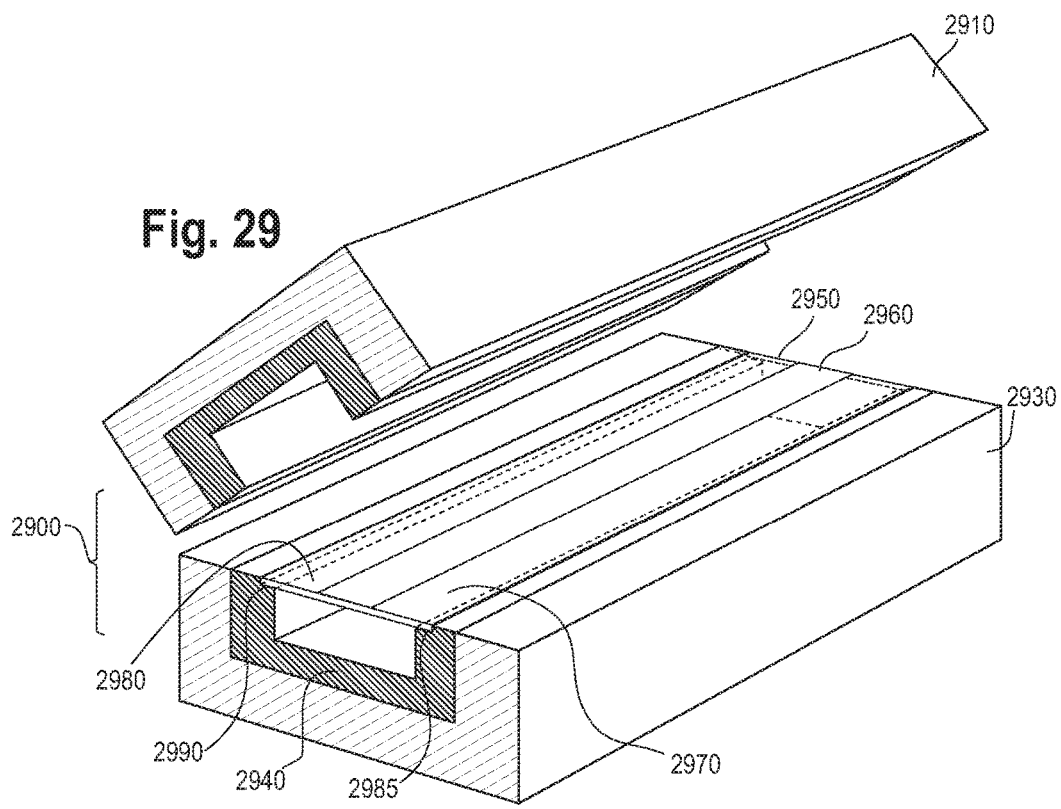
FIG. 29 illustrates an exemplary embodiment of an electrical structure including a strip line conductor on a dielectric.

As illustrated in the exemplary embodiment shown in FIG. 29, a strip-line conductor 2960 can be provided on a suitable plate 2950 disposed between first and second foam sections 2910 and 2930, respectively. The first and second foam sections 2910 and 2930 are then physically combined. Once the first and second foam sections 2910 and 2930 are combined, a conductive channel structure shown generally at 2900 is formed. Here, ends 2970 and 2980 of the strip-line conductor can be seated in recesses 2985, 2990 of a conductive surface 2940 of the second foam section 2930.

Figure 30:
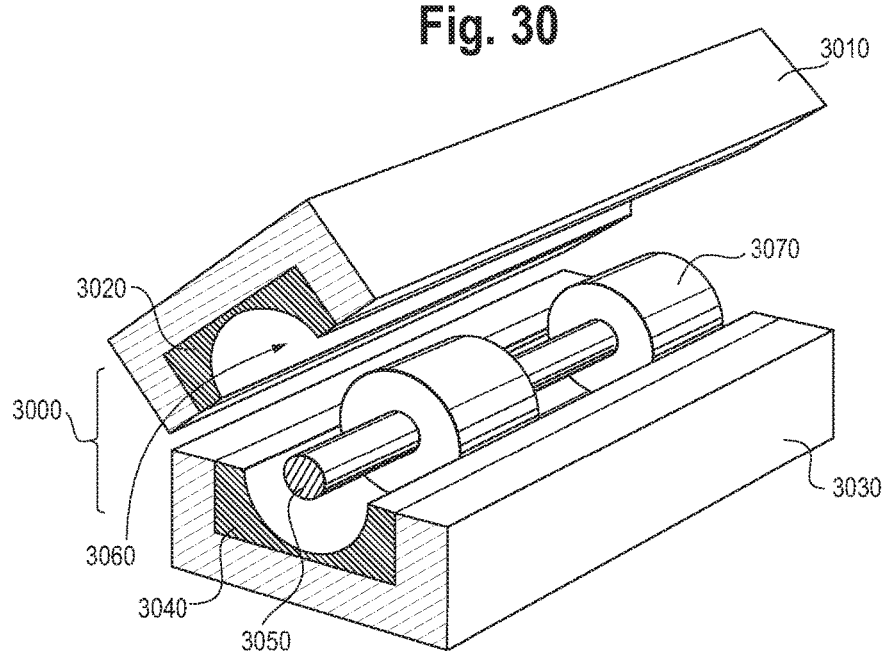
FIG. 30 illustrates an exemplary embodiment of a structure encapsulating a suspended conductor.

FIG. 30 illustrates an exemplary embodiment of a conductive channel structure shown generally at 3000. The conductive channel structure 3000 includes a first foam section 3010 and a second foam section 3030. The first foam section 3010 and the second foam section 3030 are adapted and constructed for connecting together to form an internal electrical structure, such as, for example, by fusing. To this end, conductive sections, in the form of, for example, metal plates or metallic coating 3020 and 3040 are provided in the first and second foam sections 3010 and 3030, respectively, of the conductive channel structure 3000. A coaxial center conductor 3050 can be provided in a channel 3060 in the structure 3000, formed by fusing the first foam section 3010 to the second foam section 3030. To this end, the conductor can be suspended within the channel 3060 using a conductor suspension mechanism, such as, for example, one or more foam sleeves 3070, or suspended by a plate provided between the first and second foam sections 3010 and 3030, or by an other suitable structure for suspending the center conductor 3050 within the channel 3060 formed by fusing the first foam section 3010 to the second foam section 3030.

Figure 31:
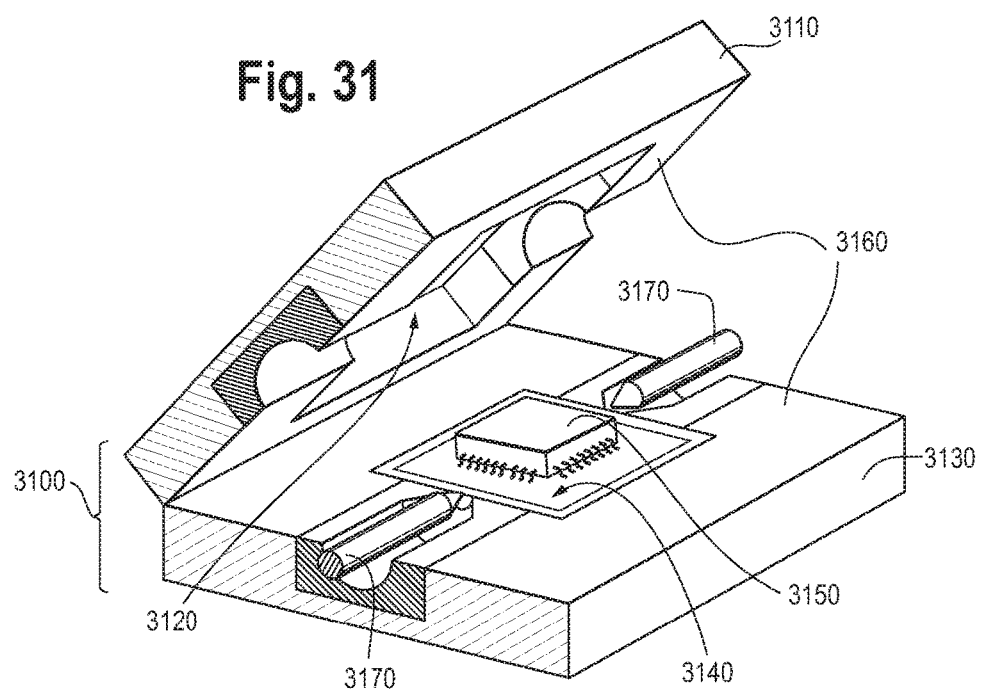
FIG. 31 illustrates an exemplary embodiment of a structure encapsulating an electrical component.

In the exemplary embodiment of FIG. 31, an active electrical element 3150 is provided in a cavity of a conductive chamber 3160 formed in a foam electrical structure shown generally at 3100. The electrical element 3150 is encapsulated within the conductive chamber 3160. The conductive chamber 3160 is formed by providing a metal coating on a recess 3120, 3140 formed in first and second foam sections 3110 and 3130, respectively and connecting the first foam section 3110 to the second foam section 3130 such as, for example, by fusing. Coaxial transmission lines 3170 transmit signals to and from active electrical element 3150

Figure 32:
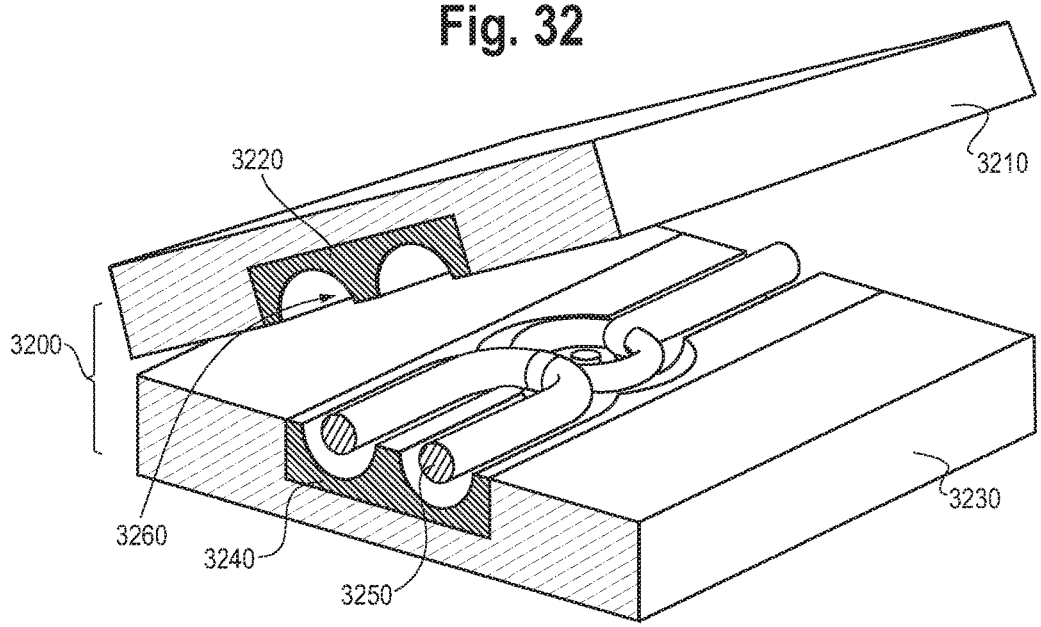
FIG. 32 illustrates an exemplary embodiment of a structure encapsulating a suspended combiner center conductor.

FIG. 32 illustrates an exemplary embodiment of an electrical structure shown generally at 3200. The structure 3200 includes a combiner center conductor 3250. The combiner center conductor is suspended within a channel 3260 formed by connecting a first foam section 3210 to a second foam section 3230. Metal layers 3220 and 3240 are integrally formed within the structure 3200 by electrically connecting, such as, for example, by fusing the first foam section 3210 to the second foam section 3230. Alternatively, other suitable components, such as, for example, a beam splitter could be incorporated into the electrical structure 3200.

Figure 33:
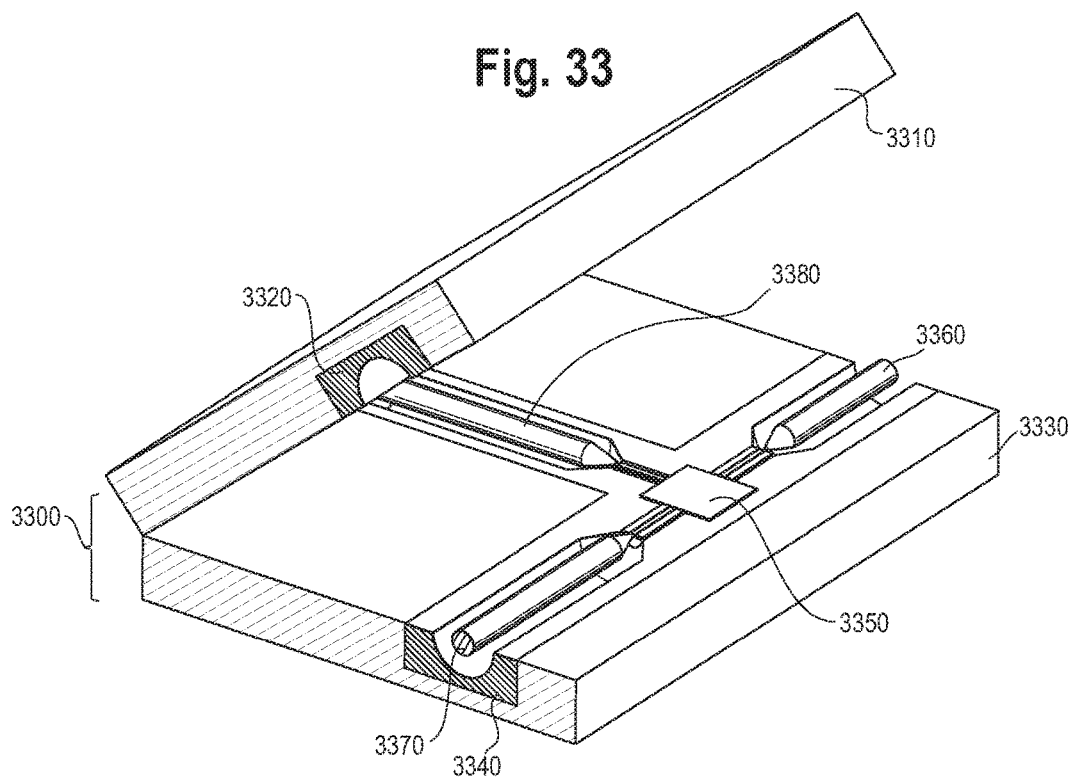
FIG. 33 illustrates an electrical structure shown generally at 3300, wherein an active electrical component, such as, for example, a combiner is encapsulated within the electrical structure.

FIG. 33 illustrates an electrical structure shown generally at 3300, wherein an active electrical component, such as, for example, a combiner 3350 is encapsulated within the electrical structure 3300 by electrically connecting a first foam section 3310 with a second foam section 3330 of the structure 3300. The combiner 3350 is adapted and constructed to transmit combined signals received from first and second conductors 3360 and 3370, respectively, to a third conductor 3380. A conductive inner surface 3320, 3340 is provided within each of the first and second foam sections 3310, 3330.

Figure 34:
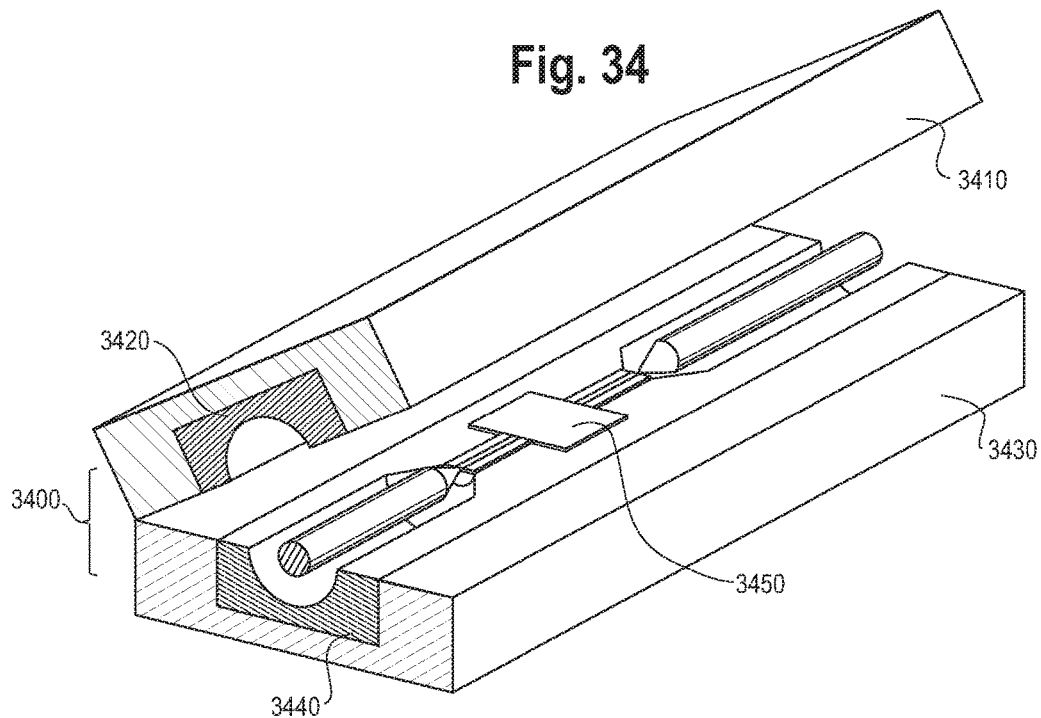
FIG. 34 illustrates an exemplary embodiment, wherein an active electrical component such as a filter or an amplifier, is encapsulated within an electrical structure.

FIG. 34 illustrates an exemplary embodiment, wherein an active electrical component 3450, such as a filter or an amplifier, is encapsulated within an electrical structure shown generally at 3400. The electrical structure 3400 includes a first foam section 3410 and a second foam section 3430. A conductive layer is provided on an internal surface of the first foam section 3410 to form a conductive inner layer 3420. A conductive layer is provided on an internal surface of the second foam section 3430 to form a second conductive layer 3440. The electrical component 3450 is encapsulated within the electrical structure 3400 when the first foam section 3410 is electrically connected to the second foam section 3430.

Numerous applications and advantages can be achieved for wave propogation and for general structural formation in accordance with the principles herein, and the examples and figures set forth are merely exemplary of the numerous possibilities for device construction.

We claim:

1. A method of manufacturing a low mass radio frequency (RF) transmission line structure comprising the steps of:

forming a first mold of a first housing section, said first mold further comprising at least a first cavity, said first cavity forming half of the RF transmission line structure;

forming a second mold of a second housing section, said second mold further comprising at least a second cavity, said second cavity forming half of the RF transmission line structure;

depositing a metallic plating material into the first and second molds to form first and second plated molds;

pouring a polymer foam into the first and second plated molds to form the first and second housing sections of the RF transmission line structure;

removing the first and second housing sections from the first and second plated molds without etching the structures from the first and second plated molds;

locating a printed circuit board comprising an electrical component between the first and second housing sections; and coupling a first side of the first housing section to a first side of the second housing section so that the first and second cavities are aligned and form the RF transmission line structure.

2. The method according to claim 1, wherein each of the first and second plated molds further comprise a stainless steel mold.

3. The method according to claim 1, wherein the plating material is selected from the group consisting of silver, copper, and gold.

* * * * *